United States Patent [19]
Oana et al.

[11] Patent Number: 6,008,869
[45] Date of Patent: Dec. 28, 1999

[54] DISPLAY DEVICE SUBSTRATE AND METHOD OF MANUFACTURING THE SAME

[75] Inventors: Yasuhisa Oana, Yokohama; Nobuki Ibaraki, Kanagawa-ken; Masayuki Dohjo, Himeji; Yoshitaka Kamata, Yokoham, all of Japan

[73] Assignee: Kabushiki Kaisha Toshiba, Kawasaki, Japan

[21] Appl. No.: 08/571,374

[22] Filed: Dec. 13, 1995

[30] Foreign Application Priority Data

Dec. 14, 1994 [JP] Japan ................................ 6-310112
Jul. 20, 1995 [JP] Japan ................................ 7-183651

[51] Int. Cl.$^6$ .......................... G02F 1/136; G02F 1/1333
[52] U.S. Cl. ........................ 349/43; 349/46; 349/158; 349/161
[58] Field of Search ............. 349/43–47, 158, 349/161

[56] References Cited

U.S. PATENT DOCUMENTS 5,565,702  10/1996  Tamura et al. .......................... 257/530

FOREIGN PATENT DOCUMENTS 56-35471   4/1981   Japan .
8-297299  11/1996   Japan .

Primary Examiner—William L. Sikes
Assistant Examiner—Julie Ngo
Attorney, Agent, or Firm—Pillsbury Madison & Sutro LLP

[57] ABSTRACT

The present invention provides a display device substrate includes a first wiring layer formed on a substrate made of an insulating material, a second wiring layer formed to cross the first wiring layer, and an insulating film interposed between the first and second wiring layers at a cross point portion therebetween, wherein the first wiring layer is constituted by an electrode wiring layer made of a material containing aluminum as a main component and a surface covering layer formed by causing a refractory metal to denature the electrode wiring layer. The present invention also provides a method of manufacturing a display device substrate in which an electrode wiring layer made of a material containing aluminum as a main component is formed on a substrate made of an insulating material, a thin film made of a refractory metal is formed on the electrode wiring layer, and heat treatment is performed to cause the refractory metal to denature a surface portion of the electrode wiring layer, thereby forming a surface covering layer.

28 Claims, 4 Drawing Sheets

DISPLAY DEVICE SUBSTRATE AND METHOD OF MANUFACTURING THE SAME

BACKGROUND OF THE INVENTION

1. Field of the Invention

The present invention relates to a display device substrate and, more particularly, to a display device substrate effectively used in a liquid crystal display device or the like having a large display screen and a method of manufacturing the display device substrate.

2. Description of Related Art

In recent years, display devices represented by a liquid crystal display device and an EL (electroluminescence) display device have been used in various fields as display devices for personal computers or word processors, TV display devices, and projection type display devices because of the characteristics such as small thickness, light weight, and low power consumption of the display devices.

Of these display devices, an active-matrix display device in which switching elements are electrically connected to pixel electrodes provides a preferred display image free from crosstalk between adjacent pixels. For this reason, the active-matrix display device is extensively researched and developed.

The transmissive type active-matrix liquid crystal display device will be briefly described below with reference to its structure. This active-matrix liquid crystal display device is constructed in the following manner. Alignment films are formed on an array substrate and a counter substrate. Both the substrates are arranged to cause the alignment films to oppose each other, and a liquid crystal composition is held between the substrates. The array substrate is constructed as follows: a plurality of signal lines and a plurality of scanning lines are arranged on a glass substrate in the form of a matrix, thin-film transistors (referred to as TFTs hereinafter) serving as switching elements are arranged near cross points between the signal lines and the scanning lines, respectively, and pixel electrodes made of ITO (Indium Tin Oxide) are provided through the TFTs. In addition, storage capacitor lines are arranged on the glass substrate to be almost parallel to the scanning lines, and an insulating film is interposed between each storage capacitor line and each pixel electrode to form a storage capacitor (Cs) between the corresponding storage capacitor line and pixel electrode.

The counter substrate is arranged as follows: a matrix-like light-shielding film for shielding the TFTs and peripheral portions of pixel electrodes from light is arranged on the glass substrate, and a counter substrate made of ITO is arranged on the light-shielding film through an insulating film.

For example, the signal lines and scanning lines of the array substrate are electrically connected to a drive circuit board through an FPC (Flexible Printed Circuitboard) obtained by forming a metal wiring layer on a polyimide film, TAB (Tape Automated Bonding) obtained by arranging a drive element on a flexible wiring substrate, or the like. The counter electrode of the counter substrate is electrically connected to the array substrate through a transfer obtained by dispersing conductive particles, such as silver particles in a resin, and electrically connected to the drive circuit board through the FPC, TAB, or the like.

A liquid crystal display device or the like having the above arrangement strongly demands high definition and a large display screen. When the device is increased in size to realize a large display screen, the distortion of the waveform of a scanning pulse applied to a scanning line or a video signal voltage applied to a signal line increases as the distance between the corresponding scanning or signal line and a power supply increases. For this reason, display nonuniformity occurs in the display screen. When a drive element is directly mounted on the array substrate, display nonuniformity occurs in the display screen due to the wiring resistance of an electrode wiring layer, arranged on the array substrate, for supplying a drive signal to the drive element. In addition, when a drive circuit portion is integrally formed on the array substrate, due to the wiring resistance of an electrode wiring layer extended on the drive circuit portion, the operation frequency of the drive circuit is limited, or display nonuniformity occurs in the display screen.

In order to solve such technical problems, a structure in which scanning lines are made of a low-resistance material, such as aluminum, has been proposed. However, aluminum easily corrodes, and an uneven surface is easily formed during manufacture of the aluminum scanning lines. For this reason, an aluminum single-layer film cannot be used as the scanning lines. Therefore, Jpn. Pat. Appln. KOKAI Publication No. 6-120503 discloses that a multilayer film obtained by forming a metal film, such as a chromium film, a tantalum film, or a titanium film on an aluminum film is used as the scanning lines.

However, in this structure, after the aluminum is formed and patterned, forming and patterning of the other metal film is required. For this reason, in order to cover the aluminum film with the other metal film, the wiring width of the other metal film must be larger than that of the aluminum film due to patterning accuracy, and the entire wiring width of the other metal film is larger than that of the aluminum film by 6 to 7 microns.

In this manner, although aluminum is used as a wiring material, it is necessary that the wiring width be large in order to achieve a low resistance. In addition, a step difference portion along an aluminum wiring layer is formed on the surface of the wiring layer, and an insulating failure may occur at the step portion in a gate insulating film or an interlevel insulator, thereby degrading reliability of the wiring layer.

SUMMARY OF THE INVENTION

The present invention has been made in consideration of the above circumstances, and provides a display device substrate capable of decreasing the resistance of a wiring layer and improving the reliability of the wiring layer.

The present invention provides a display device substrate comprising a first wiring layer formed on a substrate made of an insulating material, a second wiring layer formed a cross the first wiring layer, and an insulating film interposed between the first and second wiring layers at a cross point portion. The wiring layer is formed by an electrode wiring layer made of a material containing aluminum as a main component and a surface covering layer formed by causing a refractory metal to denature the electrode wiring layer.

According to the present invention, the refractory metal is at least one metal selected from the group consisting of chromium, hafnium, molybdenum, nickel, palladium, tantalum, titanium, vanadium, yttrium, and zirconium. The substrate preferably has a surface region containing the metal atoms.

According to the present invention, the surface coating layer is made of an intermetallic compound of aluminum and at least one metal selected from the group consisting of hafnium, tantalum, titanium, vanadium, and yttrium. The electrode wiring layer preferably contains an intermetallic compound of aluminum and titanium. The content of the titanium is not more than 25 atomic percent %.

According to the present invention, the surface covering layer preferably has a thickness of 5 to 100 nm.

The present invention also provides a method of manufacturing a display device substrate capable of obtaining the display device substrate at a high manufacturing yield.

The present invention provides a method of manufacturing a display device substrate in which an electrode wiring layer, made of a material containing aluminum as a main component, is formed on a substrate made of an insulating material, a thin film made of a refractory metal is formed on the electrode wiring layer, and heat treatment causes the refractory metal to denature a surface portion of the electrode wiring layer, thereby forming a surface covering layer.

The method of the present invention preferably further comprises selectively removing the thin film made of the refractory metal which does not contribute to denaturation of the electrode wiring layer. The method also preferably further comprises forming a wiring layer on the surface covering layer through an insulating film.

In the method of the present invention, at least one metal selected from the group consisting of chromium, hafnium, molybdenum, nickel, palladium, tantalum, titanium, vanadium, yttrium, and zirconium is used as the refractory metal.

In the method of the present invention, at least one metal selected from the group consisting of hafnium, tantalum, titanium, and vanadium is used as the refractory metal, and an intermetallic compound between the metal and aluminum is formed by denaturation of the electrode wiring layer.

In the method of the present invention, the heat treatment is preferably performed in a non-oxidation atmosphere, e.g., a nitrogen-gas atmosphere, hydrogen-gas atmosphere, an inert-gas atmosphere, or a mixed atmosphere thereof. The heat treatment is preferably performed at a temperature of 300 to 600° C. for 30 minutes or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF CURRENTLY PREFERRED EMBODIMENTS

Figure 1:
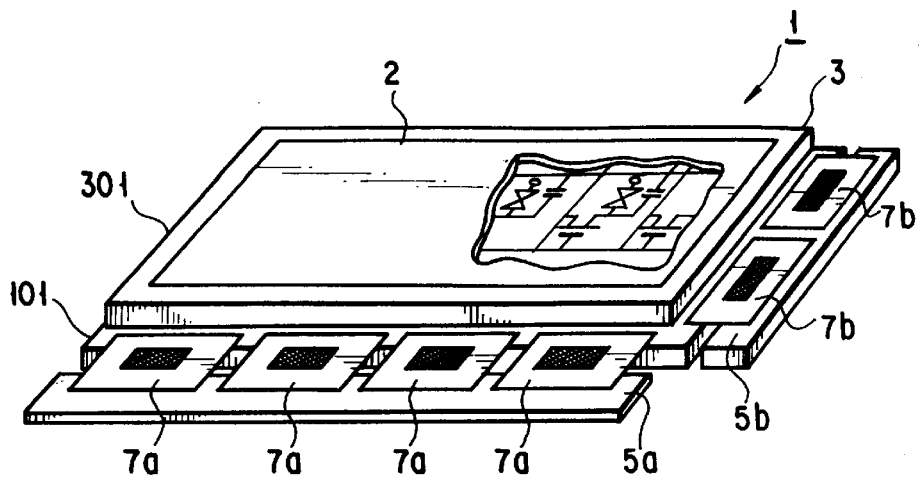
FIG. 1 is a schematic perspective view showing an active-matrix liquid crystal display device using a display device substrate according to the present invention.

A display device substrate according to the present invention comprises a first wiring layer formed on a substrate, a second wiring layer formed across the first wiring layer, and an insulating film interposed between the first and second wiring layers at the cross point portion therebetween. The display device has a first wiring layer formed by an electrode wiring layer made of a material containing aluminum (Al) as a main component and a surface covering layer formed by causing a refractory metal to denature the electrode wiring layer.

In the above structure, since the electrode wiring layer of the first wiring layer is made of the material containing aluminum (Al) as a main component, the first wiring layer has a low resistance. For this reason, waveform distortion or potential drop of scanning pulses, video signal voltages, or various drive voltages can be reduced, and a preferable display image can be assured.

Since the surface covering layer formed by causing the refractory metal to denature the electrode wiring layer is formed on the electrode wiring layer, hill-like or round blisters can be effectively prevented from forming on the electrode wiring layer. In the present invention, as the material containing aluminum (Al) as a main component, aluminum (Al), an Al—Si alloy containing about 1 atomic percent % of silicon (Si), an Al—Cu—Si alloy containing about 1 atomic percent % of copper (Cu) and about 0.5 atomic percent % of silicon (Si), an Al—Cu—Ti—B alloy, an Al—Sc—Cu alloy, an Al—Y alloy, an Al—Nd alloy, or the like, can be properly used. The refractory metal is at least one metal selected from chromium (Cr), hafnium (Hf), molybdenum (Mo), nickel (Ni), palladium (Pd), tantalum (Ta), titanium (ti), vanadium (V), yttrium (Y), and zirconium (Zr).

A method of manufacturing a display device substrate according to the present invention has an electrode wiring layer made of a material containing aluminum as a main component formed on a substrate made of an insulating material, a thin film made of a refractory metal formed on the electrode wiring layer, and heat treatment performed to cause the refractory metal to denature the surface portion of the electrode wiring layer, thereby forming a surface covering layer.

In the above method, since the surface covering layer is formed by causing the refractory metal to denature the surface portion of the electrode wiring layer, unlike a case wherein a simple multilayer structure is formed, the wiring width of the electrode wiring layer can be set to be sufficiently large in the first wiring layer. For this reason, the resistance of the wiring layer can be effectively decreased. Furthermore, since no step portion is formed on the surface covering layer, pin holes or cracks can be prevented from forming in the insulating film on the surface covering layer. Therefore, manufacturing yield can be increased.

In the method of the present invention, by using the difference of the etching rate between the material of the surface covering layer and the refractory metal deposited to form the surface covering layer, the thin film made of the refractory metal which does not contribute to the denaturation of the electrode wiring layer is selectively removed. In this case, a PEP (Photo Engraving Process) is not required to form the surface covering layer, and the number of masks required for manufacturing can be reduced, thereby improving productivity.

In the method of the present invention, the reason why the surface covering layer is formed by causing the refractory metal to denature the electrode wiring layer is to use the following phenomenon. The refractory metal easily forms a stable intermetallic compound together with the electrode wiring layer made of aluminum (Al) or a material, such as an aluminum alloy containing aluminum as a main component. The intermetallic compound is easily precipitated at a grain boundary triple point. More specifically, the mobility of aluminum (Al) atoms accelerated by thermal stress, current stress, or the like, is changed by grain boundary segregation of the intermetallic compound, i.e., the mobility of the aluminum (Al) atoms becomes extremely low with respect to the grain boundary. For this reason, the rate of formation of hills/bumps can be prevented from being increased. In brief, the grain boundary segregation of the intermetallic compound suppresses the growth of hills/bumps.

In particular, hafnium (Hf), tantalum (Ta), titanium (ti), vanadium (V), or yttrium (Y) has a small activation energy to form an intermetallic compound with aluminum, and a high diffusion rate. For this reason, a stable intermetallic compound can be easily formed at a relatively low temperature by using aluminum and each of these metals. Each of these metals and aluminum (Al) forming the electrode wiring layer easily constitutes a compound at an atomic ratio of 1:3, and the rate of the metal in the compound is low. For this reason, the lattice strain of the compound itself is small, and the compound is slightly influenced by strain scattering which is one of reasons for diffusion of electron transfer. More specifically, the compound has a relatively small influence of a decrease in conductivity of aluminum (Al), and the compound is a preferable material in the present invention.

In addition, when titanium (Ti) or a vanadium (V) is used, a homogeneous intermetallic compound is formed. For this reason, cracks or the like are not easily formed in a different-phase interface, and titanium or vanadium is effective to prevent gap corrosion based on entrance of a chemical used in etching.

Although the surface covering layer may cover only the electrode wiring layer, the thickness of the surface covering layer is desirably set to be at least 5 nm to sufficiently prevent corrosion, hills/bumps, or the like of the electrode wiring layer. If the thickness of surface covering layer exceeds 100 nm, the effect thereof tends to be saturated. For this reason, from the view point of productivity or the like, the thickness of the surface covering layer is satisfactorily set to be 100 nm or less. Therefore, the thin film made of a refractory metal and formed on the electrode wiring film may have a thickness which is necessary and sufficient to form the surface covering layer, and a thick film made of a refractory metal is not required.

In the method of the present invention, heat treatment performed to form the surface covering layer is preferably performed in an atmosphere of at least one gas selected from the group consisting of a nitrogen gas, a hydrogen gas, an inert gas (e.g., an argon gas) and a mixed gas thereof in consideration of the ease of handling in industrial use.

A display device substrate according to the present invention will be described below with reference to the accompanying drawings by using an active-matrix liquid crystal display device.

FIG. 1 is a schematic perspective view showing a display device substrate according to the present invention. An active-matrix liquid crystal display device 1 is a transmissive type liquid crystal display device having a normally white mode, and has a display area 2 having 14-inch diagonal lines and is a color display.

This active-matrix liquid crystal display device 1 comprises a liquid crystal panel 3, a signal line drive circuit board 5a and a scanning line drive circuit board 5b for driving the liquid crystal panel 3, and TABs 7a and 7b for electrically connecting the drive circuit boards 5a and 5b to the liquid crystal panel 3, respectively. Although this embodiment describes that the signal line drive circuit board 5a and the scanning line drive circuit board 5b are arranged on two sides of the liquid crystal panel 3, circuit elements may be directly mounted on the substrate of the liquid crystal panel 3.

Figure 3:
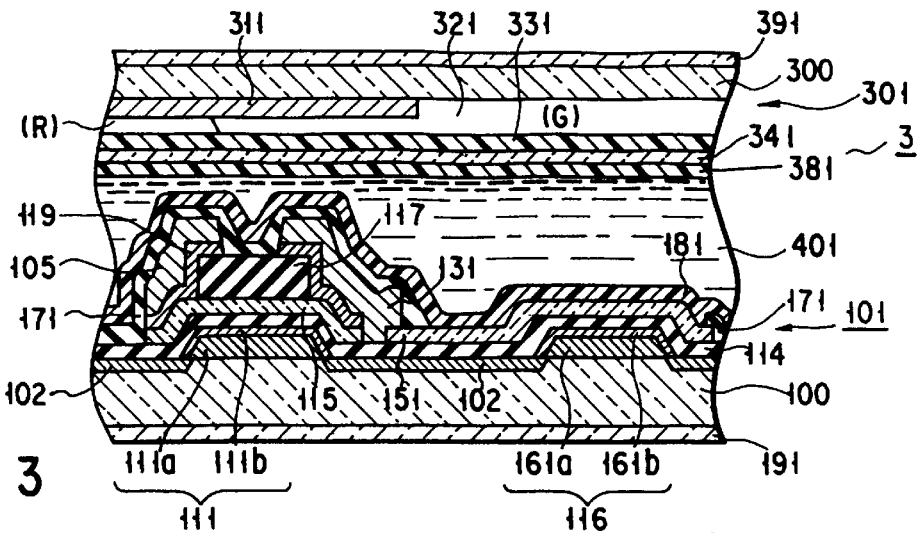
FIG. 3 is a sectional view showing the display device substrate along a III—III line in FIG. 2.

As shown in FIG. 3, in the liquid crystal panel 3, an array substrate 101, and a counter substrate 301, having alignment films 181 and 381, respectively, formed thereon, are arranged to cause the alignment films 181 and 381 to oppose each other, hold a twisted nematic liquid crystal component 401 as a light-modulation layer, and adhere to each other by a sealing material. Polarizing plates 191 and 391 are respectively arranged on the outer surfaces of the substrates 101 and 301 to cause the polarizing axes of the array substrate 101 and the counter substrate 301 to be perpendicular to each other. Note that, when a polymer dispersion liquid crystal obtained by mixing a transparent resin and a liquid crystal material with each other is used as the liquid crystal composition, an alignment film and a polarizing plate need not be arranged.

Figure 2:
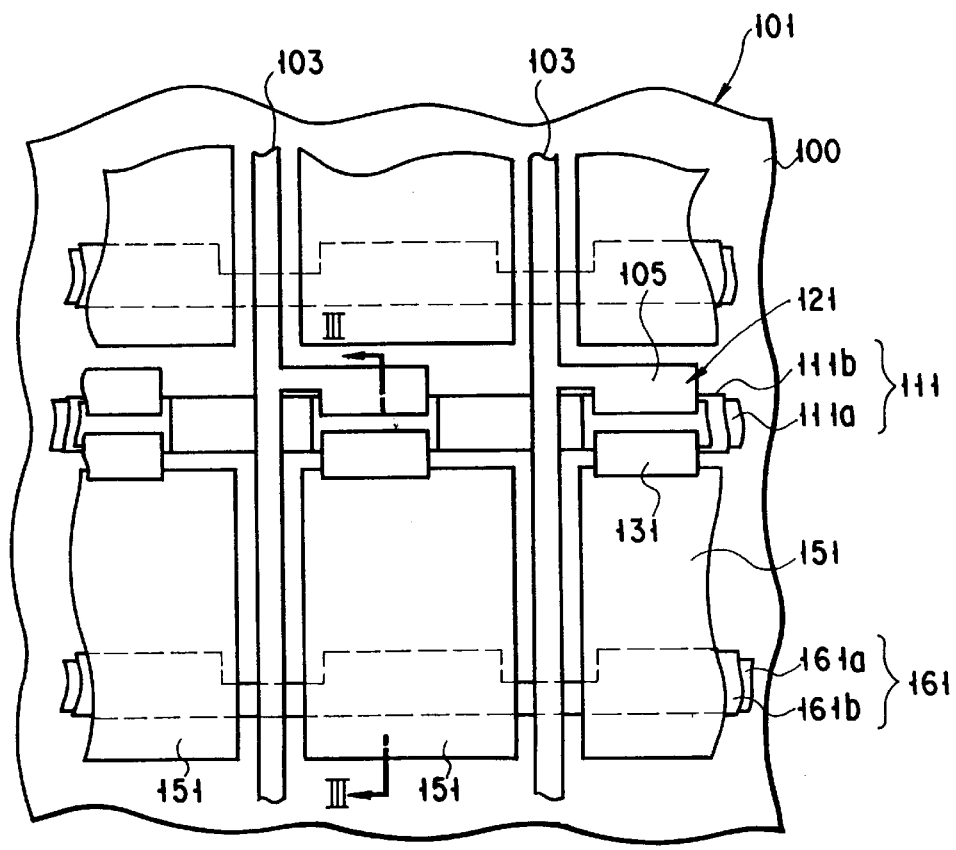
FIGS. 2 and 5 are schematic front views partially showing the display device substrate.

The array substrate 101 has the arrangement shown in FIG. 2. More specifically, 640×3 signal lines 103 and scanning lines 111 are arranged almost perpendicular to each other on a glass substrate 100. A pixel electrode 151 is arranged near the cross point between each signal line 103 and each scanning line 111 through a TFT 121. In this embodiment, the signal lines 103 and the scanning lines 111 are drawn on one side of a wiring layer to make the peripheral area size smaller than the size of the display area 2, and drive voltages are applied the drive circuit boards 5a and 5b to the signal lines 103 and the scanning lines 111 through the TABs 7a and 7b, respectively.

This TFT 121, as shown in FIGS. 2 and 3, has an inverted staggered structure which the scanning line 111 including a gate electrode is covered with silicon oxide ($SiO_2$) and silicon nitride ($SiN_x$) as a gate insulating film 114, and a semiconductor film 115 made of a-Si: H is formed on the insulating film 114. A channel protective film 117 made of silicon nitride ($SiN_x$) self-aligned to the scanning line 111. The semiconductor film 115 is electrically connected to the pixel electrodes 151 through a low-resistance semiconductor film 119 made of $n^+$-type a-Si: H and a source electrode 131. The semiconductor film 115 is connected to the signal line 103 through the low-resistance semiconductor film 119 made of $n^+$-type a-Si: H and a drain electrode 105 (formed by extending the signal line 103). A storage capacitor line 161 arranged almost parallel to the scanning line 111 to have a region overlapping the pixel electrode 151. The pixel electrode 151 and the storage capacitor line 161 constitute a storage capacitor Cs.

The counter substrate 301 comprises, on the transparent glass substrate 300, a light-shielding layer 311 having openings corresponding to each pixel electrode and made of chromium (Cr) to shield the TFT 121 formed on the array substrate 101, the gap between the signal line 103 and the pixel electrode 151, and the gap between the scanning line 111 and the pixel electrode 151. Color portions 321, made of three primary colors, i.e., red (R), green (G), and blue (B), for realizing a color display are arranged in the openings of the light-shielding layer 311, and a counter electrode 341 made of ITO is arranged on the color portions 321 through an organic protective film 331.

In this embodiment, the scanning line 111 including a gate electrode is formed by an electrode wiring layer 111a made of an aluminum (Al) film having a wiring width of 8 µm and a thickness of 280 nm and formed by sputtering and a surface covering layer 111b, having a thickness of 20 nm and made of an intermetallic compound between titanium (Ti) and aluminum (Al), for covering the electrode wiring layer 111a. Similar to the scanning lines 111, the storage capacitor line 161 is formed by an electrode wiring layer 161a and a surface covering layer 161b.

The above structure, i.e., the electrode wiring layer 111a made of aluminum (Al), is covered with the surface covering layer 111b made of a Ti—Al intermetallic compound between titanium (Ti) and aluminum (Al) and self-aligned to the electrode wiring layer 111a. Since this surface covering layer 111b is formed by causing titanium (Ti) to denature the surface portion of aluminum (Al), unlike a case wherein a layer is formed on the electrode wiring layer by patterning using a conventional photolithography method, the wiring width of the electrode wiring layer 111a can be set to be sufficiently large in the scanning line 111. For example, the wiring resistance of the scanning line having the structure of the present invention can be reduced to about ¼ the wiring resistance of a scanning line having the same wiring width of the scanning line of the present invention and constituted by an electrode wiring layer made of aluminum (Al) and a molybdenum-tantalum (Mo—Ta) alloy layer for sufficiently covering the electrode wiring layer. Therefore, the waveform distortion of a scanning pulse is suppressed, and a preferable display image free from nonuniformity can be assured.

According to the array substrate 101 of this embodiment, the electrode wiring layer 111a made of aluminum (Al) is covered with the surface covering layer 111b, hills or round blisters can be effectively prevented from being formed on the electrode wiring layer 111a. Furthermore, since the surface covering layer 111a is formed to be self-aligned to the electrode wiring layer 111a, an undesirable step is not formed on the scanning line 111, including the gate electrode, and an insulating failure of an insulating film 113 can be prevented. Therefore, an insulating failure of the TFT 121 and an insulating failure at the cross point portion between the signal line 103 and the scanning line 111 can be prevented, thereby considerably increasing manufacturing yield.

According to the array substrate 101 of this embodiment, the major surface of the glass substrate 100 except for a region in which the electrode wiring layer 111a made of aluminum (Al) includes a surface layer region 102 obtained by thermally diffusing titanium (Ti). This surface layer region 102 functions as a protective layer for the glass substrate 100 to improve the chemical resistance of the glass substrate 100. Since the surface layer region 102 is hard to etch and protects a decorating ion in the gas, a fluorine residue is left in dry etching performed by using a fluorine-based gas such as a $CF_4$ gas. For this reason, the characteristics of the TFT element can be effectively prevented from being degraded.

The array substrate 101 of the active-matrix liquid crystal display device 1 described above is manufactured in, e.g., the following manner.

Figure 4A:
FIGS. 4A to 4E are sectional views explaining processes in manufacturing the display device substrate shown in FIG. 2.

As shown in FIG. 4A, aluminum (Al) is deposited on the glass substrate 100 by sputtering to form an aluminum layer, and the aluminum (Al) layer is patterned by dry etching using ($BCl_3+Cl_2$)-based gas by using a resist film patterned by a photolithography method as a mask to form aluminum wiring layers 110a and 160a each having a thickness of 300 nm. At this time, the end portions of the resist film is tapered to taper the end portions of the aluminum wiring layers 110a and 160a. Titanium (Ti) is deposited on the entire surface of the glass substrate 100 to form a titanium layer 110b having a thickness of 10 nm.

Figure 4B:
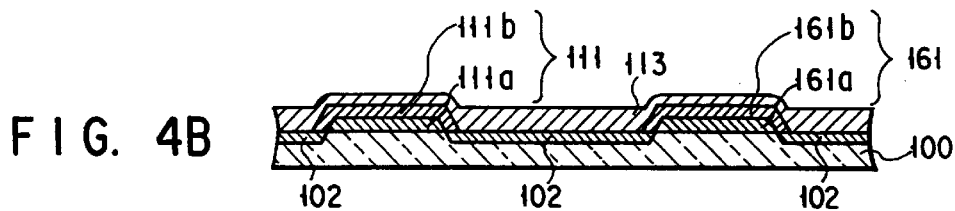

As shown in FIG. 4B, the glass substrate is subjected to heat treatment at 450° C. for 30 minutes in a nitrogen atmosphere containing 10% of hydrogen. At this time, the aluminum wiring layers 110a and 160a react with the titanium layer 110b to denature the surface portions of the aluminum wiring layers 110a and 160a by titanium (Ti), thereby forming the surface covering layers 111b and 161b made of an intermetallic compound containing titanium (Ti) and aluminum (Al) at an atomic ratio of 1:3. Note that the heat treatment process described above causes titanium (Ti) to be thermally diffused from the titanium layer 110b into the glass substrate 100 which is in contact with the titanium layer 110b to form the surface layer region 102 containing titanium (Ti).

A temperature in the heat treatment is preferably set to be 300 to 600° C., more preferably set to be 350 to 500° C., in consideration of formation of a homogeneous intermetallic compound. For example, if the heat treatment temperature is improper, an intermetallic compound containing titanium (Ti) and aluminum (Al) at an atomic ratio (1:1) different from that of this embodiment is precipitated, homogeneity may be degraded. For this reason, cracks or the like are easily formed in the intermetallic compound layer having the different phases. Therefore, the content of titanium in the intermetallic compound should not exceed 25 atomic %. Although a heat treatment time is dependent on the heat treatment temperature, when the thickness of the surface covering layer is a thin film having a thickness of about several nm to several tens nm, the heat treatment time is satisfactorily set to be about 30 minutes. Annealing may be performed for 30 minutes or more. As the heat treatment atmosphere, a non-oxidation atmosphere may be used. However, as in this embodiment, a nitrogen-gas atmosphere, a hydrogen-gas atmosphere, an atmosphere of a gas mixture of a nitrogen gas and a hydrogen gas, an inert gas atmosphere, or the like is preferably used. Note that, since the most surface portion (having a thickness of about several angstroms) of the titanium layer 110b contains an impurity such as nitrogen or oxygen, the intermetallic compound of titanium (Ti) and aluminum (Al) is not easily formed. For this reason, the most surface portion of the titanium layer 110b need not be completely denatured into an intermetallic compound in consideration of other adverse effects.

Thereafter, a non-reaction titanium layer 113 between the electrode wiring layer 111a and the electrode wiring layer 161a and only a non-reaction titanium layer 113 formed on the surface covering layers 111b and 161b, containing an impurity such as nitrogen or oxygen, and having a thickness of about several tens angstrom are selectively removed by using an EDTA (Etylenediaminetetraacetic Acid)-based etchant. The scanning line 111 integrated with a gate electrode including the electrode wiring layer 111a made of aluminum (Al) and the surface covering layer 111b made of a Ti-Al intermetallic compound covering the electrode wiring layer 111a, and the storage capacitor line 161 including the electrode wiring layer 161a made of aluminum (Al) and the surface covering layer 161a made of a Ti-Al intermetallic compound covering the electrode wiring layer 161a are simultaneously formed. Note that, in addition to the EDTA-based etchant, an HF-based or (HF+HNO$_3$)-based etchant is preferably used in etching. In addition to wet etching, dry etching may be used.

Figure 4C:
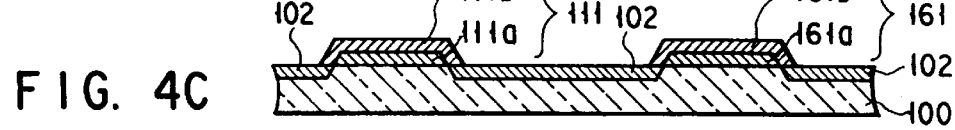

In this manner, as shown in FIG. 4C, the scanning lines 111 integrated with the gate electrode including the electrode wiring layer 111a made of aluminum and having a thickness of 280 nm and the surface covering layer (111b) made of a Ti—Al intermetallic compound and having a thickness of 20-nm, and the storage capacitor line 161 including the electrode wiring layer 161a made of aluminum (Al) and having a thickness of 280 nm and the surface covering layer 161b having a thickness of 20 nm and made of a Ti—Al intermetallic compound are simultaneously formed.

Thereafter, this glass substrate is arranged in a plasma CVD reaction chamber, a 100-nm insulating film 114 made of silicon oxide (SiO$_2$) and silicon nitride (SiN$_x$) is formed on the glass substrate, a 50-nm a-Si: H film is formed on the insulating film 114, and a 300-nm silicon nitride (SiN$_x$) film is formed on the a-Si: H film.

Figure 4D:
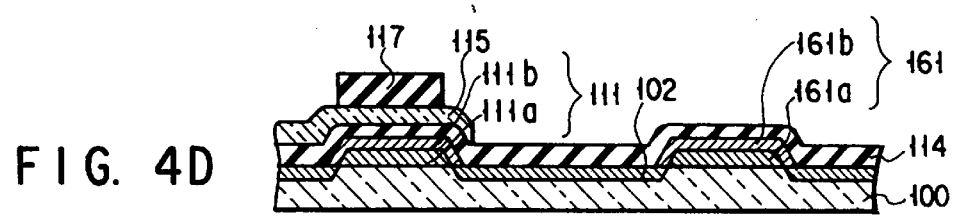

As shown in FIG. 4D, the a-Si: H film is patterned in the form of an island to obtain the semiconductor film 115, the silicon nitride (SiN$_x$) film is patterned by back-side (lower-surface) exposure using the scanning line 111 as a mask to self-align the silicon nitride (SiN$_x$) film to the scanning line 111, thereby forming the channel protective film 117.

Figure 4E:
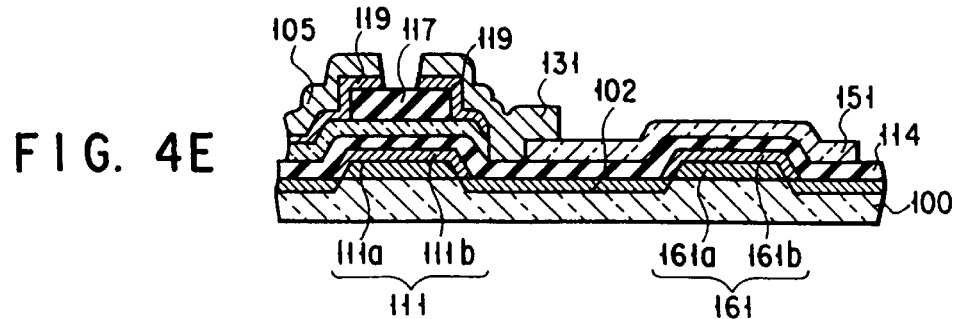

As shown in FIG. 4E, an n$^+$-type a-Si: H film is formed on the channel protective film 117 and patterned in the form of an island, and an ITO film is formed and patterned to form the pixel electrode 151. A conductive layer having a 3-layer structure consisting of molybdenum (Mo), aluminum (Al), and molybdenum (Mo) is formed on the resultant structure, and the conductive layer and the n$^+$-type a-Si: H film are patterned to form the low-resistance semiconductor film 119, the source electrode 131 for electrically connecting the semi-conductor film 115 and the pixel electrode 151 to each other through the low-resistance semiconductor film 119, the drain electrode 105 electrically connected to the semiconductor film 115 through the low-resistance semiconductor film 119, and the signal line 103 (see FIG. 2) integrated with the drain electrode 105. As described above, the array substrate 101 of the active-matrix liquid crystal display device 1 according to this embodiment is manufactured.

In this embodiment, the thickness of the titanium layer 110b is determined such that the aluminum wiring layers 110a and 160a almost completely react with each other to obtain the surface covering layers 111b and 161b each having a desired thickness, and the titanium layer 110b having this thickness is formed. However, the thickness of the titanium layer 110b may be larger than the predetermined value, and the non-reaction titanium layer 110b may be sufficiently removed by etching. In consideration of mass-production stability, the thickness of the titanium layer 110b may be set depending on the thicknesses of the surface covering layers 111b and 161b obtained when the titanium layer 110b sufficiently reacts, thereby reducing dependence on a temperature and a time.

This embodiment describes that the scanning line 111 is constituted by the electrode wiring layer 111a made of aluminum (Al) and the surface covering layer 111b which makes of a Ti—Al intermetallic compound between titanium (Ti) and aluminum (Al) and is formed to cover the -electrode wiring layer 111a and to be self-aligned to the electrode wiring layer 111a. However, the surface covering layer 111b may be made of an intermetallic compound between aluminum (Al) and not only titanium (Ti) but also hafnium (Hf), tantalum (Ta), or vanadium (V).

An active-matrix liquid crystal display device according to another embodiment of the present invention will be described below. Note that the same reference numerals as in the embodiment described above denote the same parts in this embodiment.

Figure 5:
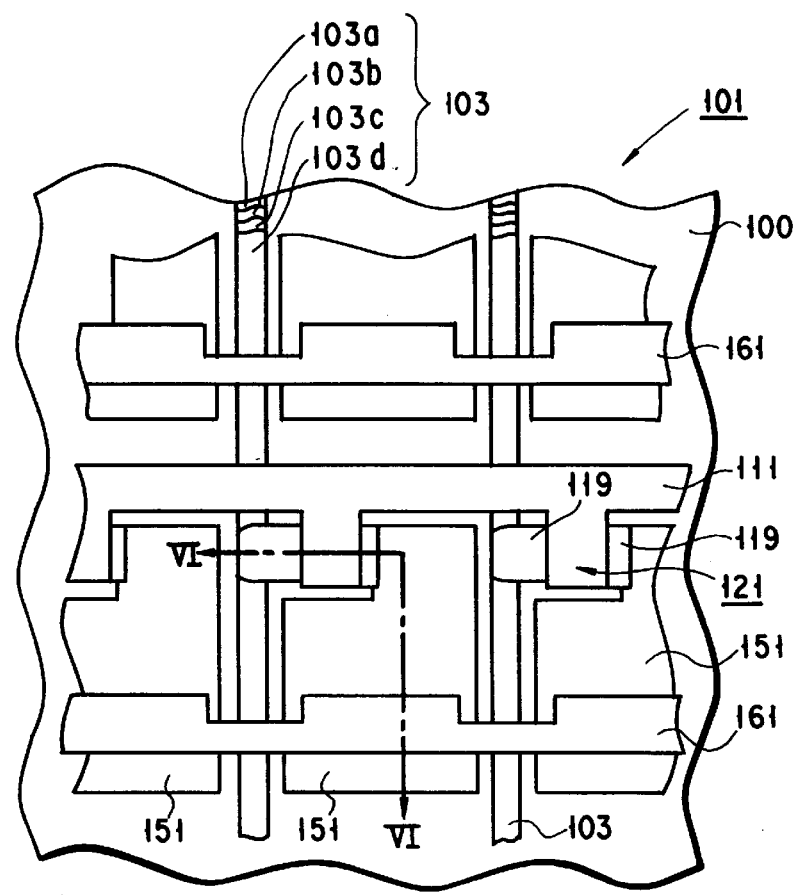

In an array substrate 101 according to this embodiment, as shown in FIG. 5, 640×3 signal lines 103 and scanning lines 111 are arranged almost perpendicular to each other on a glass substrate 100. A pixel electrode 151 is arranged near the cross point between each signal line 103 and each scanning line 111 through a TFT 121.

Figure 6:
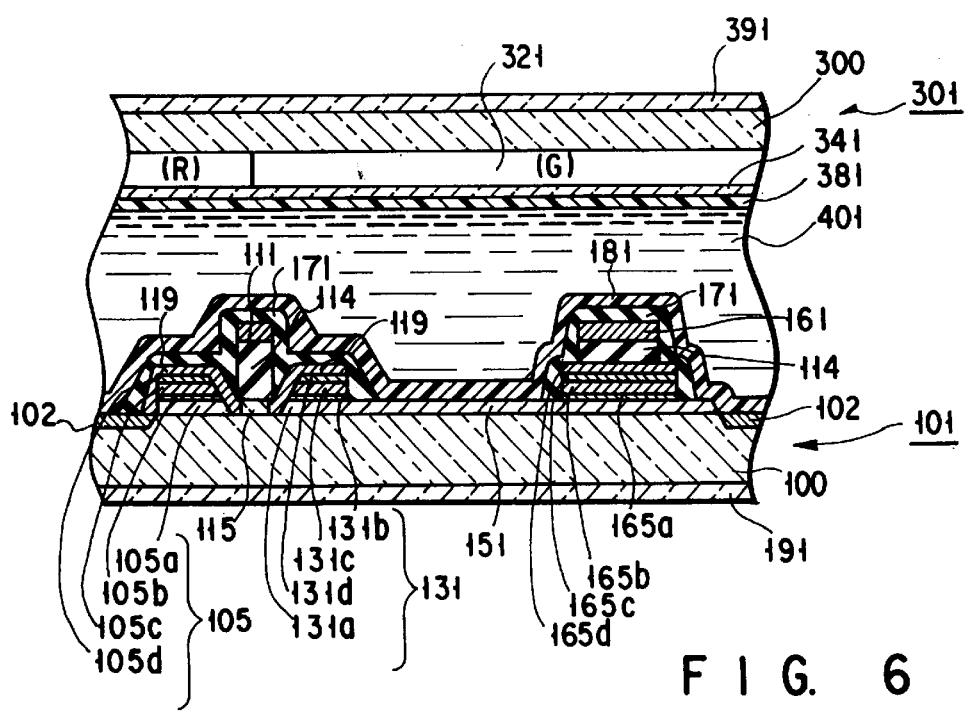
FIG. 6 is a sectional view showing the active-matrix liquid crystal display device along a VI—VI line in FIG. 5.

As shown in FIGS. 5 and 6, this TFT 121 has a normal staggered structure including a drain electrode 105 integrated with the signal line 103 and a source electrode 131 which is arranged to be spaced apart from the drain electrode 105 and electrically connected to the pixel electrode 151. N$^+$-type low-resistance semiconductor films 119 are arranged on the drain electrode 105 and the source electrode 131, respectively, and an a-Si: H film is arranged as a semiconductor film 115 between the low-resistance semi-conductor films 119. A gate electrode integrated with the scanning line 111 is formed on the semi-conductor film 115 through an insulating film 114 made of silicon nitride (SiN$_x$). The TFT 121 comprises a storage capacitor line 161 which is arranged almost parallel to the scanning line 111 to two-dimensionally overlap the pixel electrode 151, and a storage capacitor (Cs) is formed by the pixel electrode 151 and the storage capacitor line 161.

The counter substrate 301 has the following structure. That is, color portions 321 consisting of three primary colors, i.e., red (R), green (G), and blue (B) for realizing a color display are arranged, and a counter electrode 341 made of ITO is formed thereon.

In this embodiment, the signal line 103, the drain electrode 105 integrated with the signal line 103, and the source electrode 131 comprise first electrode wiring layers 103a, 105a, and 131a, each having a wiring width of 5 μm, formed simultaneously with the pixel electrode 151, and made of ITO, second electrode wiring layers 103b, 105b, and 131b, each having a thickness of 50 nm and made of molybdenum (Mo), third electrode wiring layers 103c, 105c, and 131c each having a thickness of 280 nm and made of aluminum (Al): and surface covering layers 103d, 105d, and 131d, each having a thickness of 20 nm and made of an intermetallic compound between titanium (Ti) and aluminum (Al) for covering the third electrode wiring layers 103c, 105c, and 131c.

In the above structure, i.e., the structure in which the third electrode wiring layer 103c made of aluminum (Al) is covered with the surface covering layer 103d which is formed to be self-aligned to the third electrode wiring layer 103c and makes of a Ti—Al intermetallic compound between titanium (Ti) and aluminum (Al), the signal line 103 achieves a low resistance. For this reason, high-definition display image can be assured.

According to the array substrate 101 of this embodiment, since the third electrode wiring layer 103c made of aluminum (Al) is covered with the surface covering layer 103d in a self-alignment manner, hills, round blisters, or the like formed on the third electrode wiring layer 103c can be prevented without increasing the wiring width of the signal lines 103. In addition, since an undesirable step portion is not formed on the surface covering layer 103d, an insulating failure of the insulating film 114 interposed between the signal line 103 and the scanning line 111 at a cross point portion therebetween can be prevented, and a manufacturing yield can be considerably increased.

According to this embodiment, since the signal line 103 is formed by the first electrode wiring layer 103a made of ITO, the second electrode wiring layer 103b made of molybdenum (Mo), the third electrode wiring layer 103c made of aluminum (Al), and the surface covering layer 103d, redundancy with respect to disconnection, and not only a short-circuit failure, but also an open failure can be sufficiently reduced.

Figure 7A:
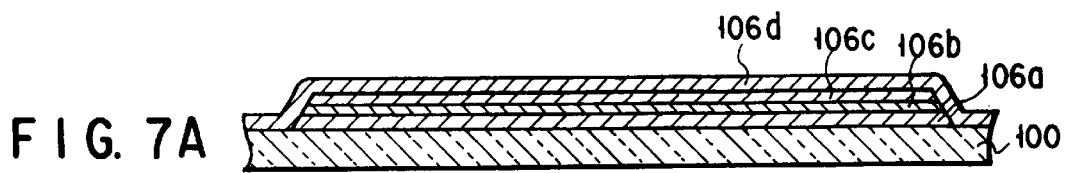
FIGS. 7A to 7F are sectional views for explaining processes in manufacturing the display device substrate shown in FIG. 5.

The array substrate 101 described above is manufactured in the following manner. As shown in FIG. 7A, ITO, molybdenum (Mo), and aluminum (Al) are sequentially deposited on the glass substrate 100 by sputtering to have thicknesses 40 nm, 50 nm, and 300 nm, respectively, and the ITO, molybdenum (Mo), and aluminum (Al) are patterned to form an ITO film 106a, a molybdenum film 106b, and an aluminum wiring layer 106c. Titanium (Ti) is deposited on the aluminum wiring layer 106c by sputtering to form a titanium layer 106d having a thickness of 10 nm. Note that the molybdenum film 106b serves as a barrier metal to make the electrical contact between the ITO film 106a and the aluminum wiring layer 106c preferable. In this case, a refractory metal such as titanium (Ti), chromium (Cr), or tantalum (Ta) may be used in place of molybdenum.

Figure 7B:
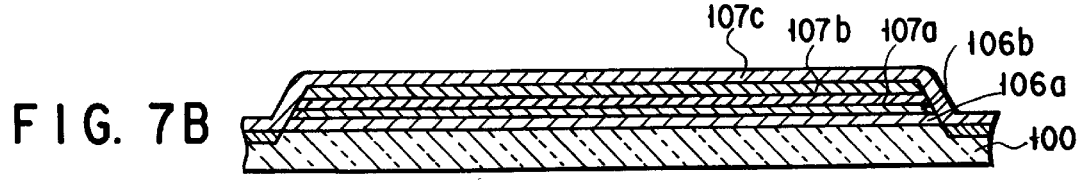

As shown in FIG. 7B, the resultant structure is subjected to heat treatment at 450° C. for 30 minutes in a nitrogen-gas atmosphere containing 10% of hydrogen. At this time, the surface portion of the aluminum wiring layer 106c reacts with the titanium layer 106d to cause titanium to denature the surface portion of the aluminum wiring layer 106c, thereby a surface covering layer 107b made of an intermetallic compound mainly containing of titanium (Ti) and aluminum (Al) at an atomic ratio of 1:3. Note that the heat treatment process described above thermally diffuses titanium (Ti) from the titanium layer 106d into the glass substrate 100 which is in contact with the titanium layer 106d, thereby a surface layer region 102.

Figure 7C:
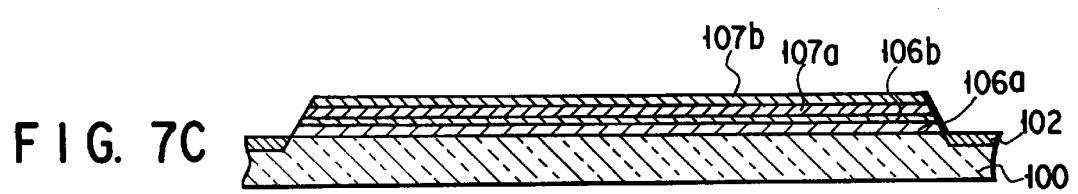

Thereafter, a non-reaction titanium layer 107c between the wiring layers and only a non-reaction titanium layer 107c formed on the surface covering layer 107b, containing an impurity such as nitrogen or oxygen, and having a thickness of about several angstrom are selectively removed by using an EDTA-based etchant to form the first electrode wiring layer 106a made of ITO, the second electrode wiring layer 106b made of molybdenum (Mo), a third electrode wiring layer 107a made of aluminum (Al) and a thickness of 280 nm, and the surface covering layer 107b made of a Ti—Al intermetallic compound and having a thickness of 20 nm, as shown in FIG. 7C. Note that, as in the above embodiment, in addition to the EDTA-based etchant, an HF-based or (HF+HNO$_3$)-based etchant is preferably used in etching. In addition to wet etching, dry etching may be used.

Figure 7D:
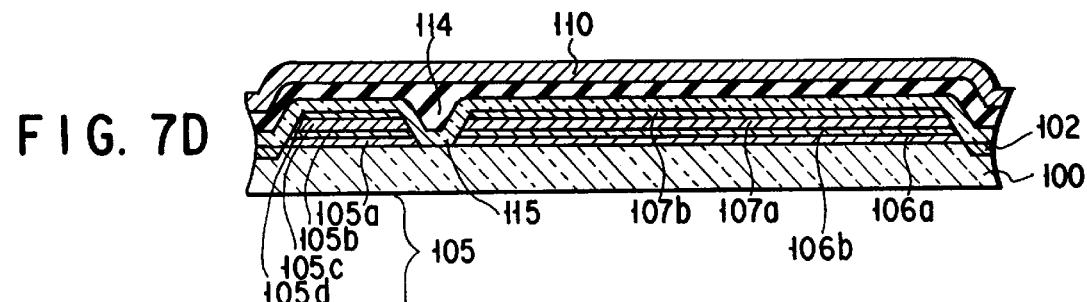

As shown in FIG. 7D, the first, second, and third electrode wiring layers 106a, 106b, and 107a, and the surface covering layer 107b corresponding to the channel region of the TFT are removed. Thereafter, the glass substrate is arranged in a plasma CVD reaction chamber, and an a-Si: H film is formed on the glass substrate to form a semiconductor film 115 having a thickness of 50 nm. Silicon nitride (SiN$_x$) is deposited on the semiconductor film 115 to form an insulating film 114 having a thickness of 400 nm, and aluminum (Al) is deposited on the insulating film 114 to form a conductive layer 110 having a thickness of 300 nm.

Figure 7E:
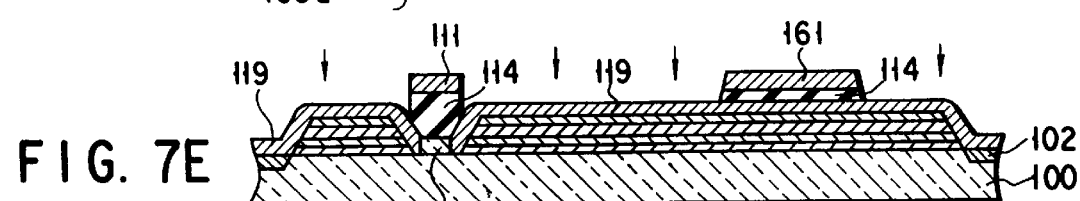

As shown in FIG. 7E, the conductive layer 110 made of aluminum (Al) is patterned to form a gate electrode, the scanning line 111 integrated with the gate electrode, and a storage capacitor line 161, and the insulating film 114 is patterned along the patterns of the gate electrode, the scanning line 111, and the storage capacitor line 161. Subsequently, by using an ion-doping method, P ions serving as the source of (PH$_3$+H$_2$) plasma are implanted in a-Si: H film 115 using the patterns of the gate electrode, the scanning line 111, and the storage capacitor line 161 as a mask. Thereafter, the resultant structure is subjected to heat treatment by a method such as an ELA (Excimer Laser Annealing) method to partially activate the entire surface of the resultant structure except for a region corresponding to the scanning line 111 and the storage capacitor line to form an n$^+$-type low-resistance semiconductor film 119.

Figure 7F:
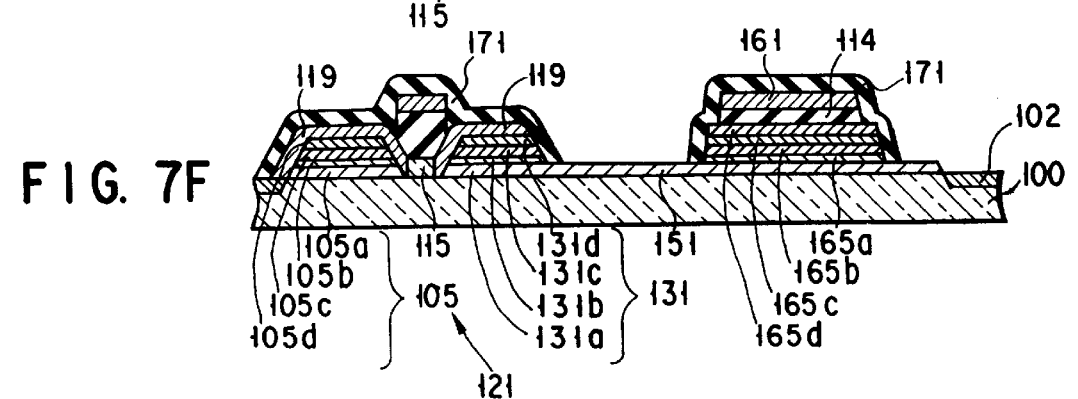

Thereafter, as shown in FIG. 7F, the low-resistance semiconductor film 119 is patterned along the TFT region and the storage capacitor line 161, and the unnecessary third electrode wiring layer 107a and the unnecessary surface covering layer 107b on the ITO film 106a along the pattern of the low-resistance semiconductor film 119 are removed to form the pixel electrode 151 made of ITO, the first electrode wiring layers 103a, 105a, and 131a made of ITO, the second electrode wiring layers 103b 105b, and 131b made of molybdenum (Mo), the third electrode wiring layers 103c, 105c, and 131c made of aluminum (Al), the signal line 103 (see FIG. 5) including the surface covering layers 103d, 105d, and 131d, the drain electrode 105, and the source electrode 131.

In addition, a silicon nitride (SiN$_x$) film is formed on the resultant structure, the silicon nitride (SiN$_x$) film on the region except for the TFT 121 and the storage capacitor line 161 is removed to form a protective film 171, thereby completing the array substrate 101.

In this embodiment, as in the above embodiment, the third electrode wiring layers 103c, 105c, and 131c made of aluminum (Al) are covered with the surface covering layers 103d, 105d, and 131d made of a Ti—Al intermetallic compound between titanium (Ti) and aluminum (Al) and formed to be self-aligned to the third electrode wiring layers 103c, 105c, and 131c, a PEP can be omitted when the surface covering layers 103d, 105d, and 131d are patterned.

This embodiment describes that the surface covering layers 103d, 105d, and 131d is made of the Ti—Al intermetallic compound between titanium (Ti) and aluminum (Al). The surface covering layers 103d, 105d, and 131d may be made of an intermetallic compound between aluminum (Al) and hafnium (Hf), tantalum (Ta), or vanadium (V) in place of the Ti—Al intermetallic compound.

Each of the embodiments described above describes that the signal and scanning lines comprise the electrode wiring layer made of a material containing aluminum as a main component and the surface covering layer obtained by causing at least one metal selected from chromium, hafnium, molybdenum, nickel, palladium, tantalum, titanium, vanadium, yttrium, and zirconium to denature the surface portion of the electrode wiring layer. The present invention is not limited to application to a signal line or a scanning line. For example, when a drive element is directly mounted on an array substrate, the present invention may be applied to an electrode wiring layer on the array substrate for supplying a drive signal to the drive element. In addition, when the drive circuit is integrated with the array substrate, the present invention may be applied to the electrode wiring layer extended in the drive circuit.

According to a display device substrate according to the present invention and a method of manufacturing the same, since a first wiring layer has an electrode wiring layer made of a material containing aluminum as a main component, the first wiring layer achieves a low resistance. In addition, since the first wiring layer comprises a surface covering layer formed to be self-aligned to the electrode wiring layer, formation of hills/bumps or round blisters can be sufficiently reduced. Therefore, manufacturing yield can be considerably increased.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display device substrate, comprising
  a first wiring layer formed on a substrate, said substrate comprising an insulating material, said first wiring layer comprising:
    an electrode wiring layer comprised of a material containing aluminum as a main component, and
    a surface covering layer formed by denaturing a surface region of said electrode wiring layer with a refractory metal;
  a second wiring layer extending across said first wiring layer; and
  an insulating film interposed between said first and second wiring layers at a cross point portion therebetween.

2. The display device substrate according to claim 1, wherein said refractory metal substantially consists of at least one metal selected from the group consisting of chromium, hafnium, molybdenum, nickel, palladium, tantalum, titanium, vanadium, yttrium, and zirconium.

3. The display device substrate according to claim 2, wherein said refractory metal is disposed on at least a part of a surface of said substrate, except for a region of said surface of said substrate on which said first wiring layer is formed.

4. The display device substrate according to claim 1, wherein said surface covering layer comprises an intermetallic compound of aluminum and at least one metal selected from the group consisting of hafnium, tantalum, titanium, vanadium, and yttrium.

5. The display device substrate according to claim 4, wherein said surface covering layer comprises an intermetallic compound of aluminum and titanium, and a content of the titanium in said surface covering layer ranges from some to not more than 25 atomic %.

6. The display device substrate according to claim 1, wherein said surface covering layer has a thickness of 5 to 100 nm.

7. The display device substrate according to claim 1, further comprising:
  a semiconductor element including a gate electrode, a gate insulating film disposed on said gate electrode, a semiconductor film disposed on said gate insulating film, a drain electrode, and a source electrode, said drain and source electrodes being electrically connected to said semiconductor film, respectively;
  wherein said second wiring layer is a signal line electrically connected to said drain electrode, and
  said first wiring layer is a scanning line electrically connected to said gate electrode.

8. The display device substrate according to claim 7, wherein said refractory metal substantially consists of at least one metal selected from the group consisting of chromium, hafnium, molybdenum, nickel, palladium, tantalum, titanium, vanadium, yttrium, and zirconium.

9. The display device substrate according to claim 8, wherein said refractory metal is disposed on at least a part of a surface of said substrate, except for a region of said surface of said substrate in which said first wiring layer is formed.

10. The display device substrate according to claim 7, wherein said surface covering layer comprises an intermetallic compound of aluminum and at least one metal selected from the group consisting of hafnium, tantalum, titanium, vanadium, and yttrium.

11. The display device substrate according to claim 10, wherein said surface covering layer comprises an intermetallic compound of aluminum and titanium, and a content of the titanium in said surface covering layer ranges from some to not more than 25 atomic %.

12. The display device according to claim 7, wherein said surface covering layer has a thickness of 5 to 100 nm.

13. The display device substrate according to claim 1, wherein said surface covering layer is formed before forming said second wiring layer and said insulating film.

14. The display device substrate according to claim 1, further comprising:
  a semiconductor element including a gate electrode, a gate insulating film disposed on said gate electrode, a semiconductor film disposed on said gate insulating film, a drain electrode, and a source electrode, said drain and source electrodes being electrically connected to said semiconductor film, respectively,
  wherein said first wiring layer is a signal line electrically connected to said drain electrode, and
  said second wiring layer is a scanning line electrically connected to said gate electrode.

15. A display device substrate, comprising:
  a first wiring layer formed on a substrate, said substrate comprising an insulating material, said first wiring layer comprising:
    an electrode wiring layer comprised of a material containing aluminum as a main component, and
    a surface covering layer formed by denaturing a surface region of said electrode wiring layer with a refractory metal and aluminum in said surface region of said electrode wiring layer;
  a second wiring layer extending across said first wiring layer; and
  an insulating film interposed between said first and second wiring layers at a cross point portion therebetween.

16. The display device substrate according to claim 15, wherein said refractory metal substantially consists of at least one metal selected from the group consisting of chromium, hafnium, molybdenum, nickel, palladium, tantalum, titanium, vanadium, yttrium, and zirconium.

17. The display device substrate according to claim 16, wherein said refractory metal is disposed on at least a part of a surface of said substrate, except for a region of said surface of said substrate on which said first wiring layer is formed.

18. The display device substrate according to claim 15, wherein said surface covering layer comprises an intermetallic compound of aluminum and at least one metal selected from the group consisting of hafnium, tantalum, titanium, vanadium, and yttrium.

19. The display device substrate according to claim 18, wherein said surface covering layer contains an intermetallic compound of aluminum and titanium, and a content of the titanium in said surface covering layer ranges from some to not more than 25 atomic %.

20. The display device substrate according to claim 15, wherein said surface covering layer has a thickness of 5 to 100 nm.

21. The display device substrate according to claim 15, wherein said electrode wiring layer and said surface covering layer are formed by denaturing a surface region of an aluminum containing wiring layer with said refractory metal before forming said second wiring layer and said insulating film.

22. The display device substrate according to claim 15, further comprising:
   a semiconductor element including a gate electrode, a gate insulating film disposed on said gate electrode, a semiconductor film disposed on said gate insulating film, a drain electrode, and a source electrode, said drain electrode and said source electrode being electrically connected to said semiconductor film respectively;
   wherein said second wiring layer is a signal line electrically connected to said drain electrode, and
   said first wiring layer is a scanning line electrically connected to said gate electrode.

23. The display device substrate according to claim 22, wherein said refractory metal substantially consists of at least one metal selected from the group consisting of chromium, hafnium, molybdenum, nickel, palladium, tantalum, titanium, vanadium, yttrium, and zirconium.

24. The display device substrate according to claim 23, wherein said refractory metal is disposed on at least a part of a surface of said substrate, except for a region of said surface of said substrate on which said first wiring layer is formed.

25. The display device substrate according to claim 22, wherein said surface covering layer contains an intermetallic compound of aluminum and at least one metal selected from the group consisting of hafnium, tantalum, titanium, vanadium, and yttrium.

26. The display device substrate according to claim 25, wherein said surface covering layer contains an intermetallic compound of aluminum and titanium, and a content of the titanium in said surface covering layer ranges from some to not more than 25 atomic %.

27. The display device according to claim 22, wherein said surface covering layer has a thickness of 5 to 100 nm.

28. The display device substrate according to claim 15, further comprising:
   a semiconductor element including a gate electrode, a gate insulating film disposed on said gate electrode, a semiconductor film disposed on said gate insulating film, a drain electrode, and a source electrode, said drain electrode and said source electrode being electrically connected to said semiconductor film, respectively,
   wherein said first wiring layer is a signal line electrically connected to said drain electrode, and
   said second wiring layer is a scanning line electrically connected to said gate electrode.

* * * * *